March 20, 1956   L. O. FRENCH   2,738,612
ARTIFICIAL FISH BAIT
Filed July 13, 1953
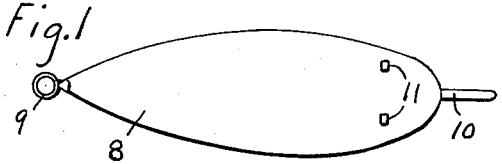
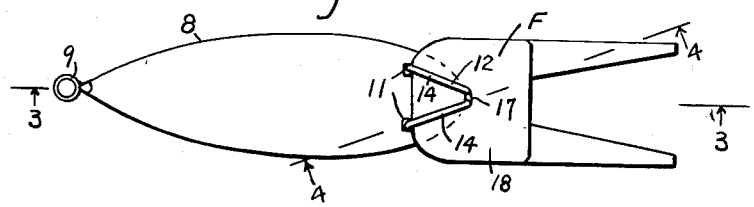
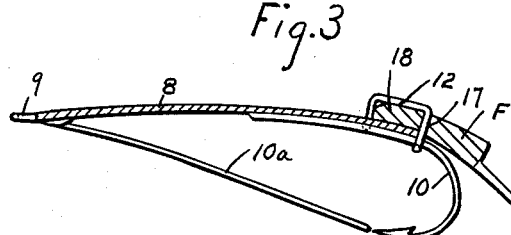
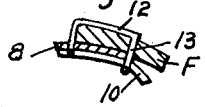   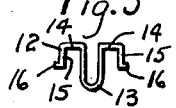
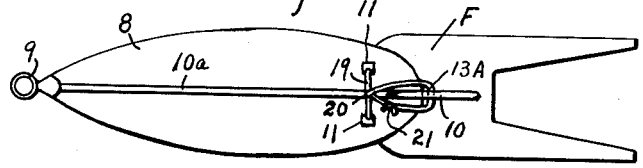
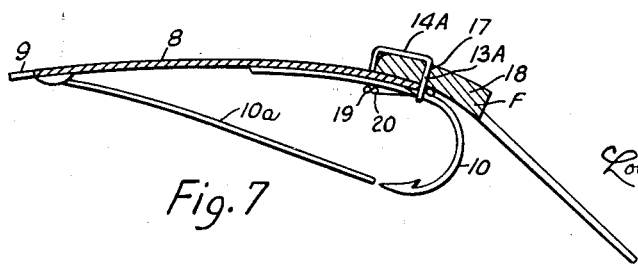
INVENTOR.
Louis O. French

United States Patent Office 2,738,612
Patented Mar. 20, 1956

2,738,612
ARTIFICIAL FISH BAIT
Louis O. French, Milwaukee, Wis.

Application July 13, 1953, Serial No. 367,707

4 Claims. (Cl. 43—42.29)

The invention relates to artificial fish baits and more particularly to a casting spoon of the type having a fixed hook extending rearwardly of the spoon and usually provided with a weed guard.

In casting spoons of the type above described, it is common practice to mount a pork rind simulating a frog or one or more pieces of pork rind strip on the hook of the bait, but with such an arrangement the fish, if it strikes, frequently hits the extended end of the pork frog or pork strip and misses the hook. The object of the present invention is to provide a casting spoon of the type above described with means for fastening the pork frog or pork strip to the end of the spoon so that if the fish strikes the rear end of the bait, it will be hooked. More particularly, the invention is designed to provide fastening openings at the rear of the spoon adjacent the rearwardly extending shank of the hook which do not detract from the general appearance of the spoon and by which a pork frog, pork chunk, or pork strip may be readily attached to the body of the spoon by a fastener, either of spring wire or of flexible cord, such as a fish line.

The invention further consists in the several features hereinafter set forth and more particularly defined by claims at the conclusion hereof.

In the drawings:

Fig. 1 is a top plan view of a casting spoon embodying the invention;

Fig. 2 is a top plan view of the spoon with a pork rind simulating a frog attached thereto;

Fig. 3 is a vertical sectional view taken on the line 3—3 of Fig. 2;

Fig. 4 is a fragmentary vertical sectional view taken on the line 4—4 of Fig. 2;

Fig. 5 is a detailed elevation view of the fastener shown in Fig. 2;

Fig. 6 is a bottom plan view of a modified form of the invention;

Fig. 7 is a vertical sectional view similar to Fig. 5 of the modification shown in Fig. 6.

Referring to Figs. 1 and 3, the casting bait includes a metal spoon 8 having a line attaching eye 9 at one end and a hook 10 projecting from its other end, the shank of the hook usually being soldered to the bottom of the spoon and protected from weeds by a flexible metal weed guard 10a usually formed of spring wire soldered to the front end of the spoon and forming the eye 9. The bait thus far described is of well known construction. With such forms of bait, pork rind strips and pork rind frogs or chunks are commonly secured to bait by passing the hook through a slit in the strip, chunk, or frog so that the strip, chunk, or frog streams out behind the hook 10. With such an arrangement, fish are frequently lost because in striking at the strip, chunk, or frog they miss the hook.

The present invention is designed to provide a means for mounting a pork rind frog, a pork chunk or a pork strip or strips directly on the spoon portion of the bait so that when the fish hits the frog chunk or strip, it will also hit the hook, and consequently the chances of catching the fish are greatly increased. For this purpose the spoon is provided with a pair of spaced openings 11 on opposite sides of the shank of the hook 10 and adjacent the back end of the spoon. These openings may be round holes but are preferably elongated holes somewhat longer than they are wide.

For attaching the pork rind lure such as a pork rind frog F to the bait, I preferably provide a clip or fastener 12 of spring wire, such as stainless spring steel or spring bronze, formed to provide a looped end portion 13 (Fig. 5), diverging top portions 14, and legs 15 having angled ends 16. The looped portion is adapted to engage over the shank of the hook 10 at or adjacent the rear end of the spoon, and the outer ends of the legs 15 are adapted to be inserted in the openings 11 in the spoon and then allowed to spring outwardly or laterally of said opening so that the ends 16 thereof catch on the underside of the spoon adjacent said openings.

For attaching the pork frog to the bait, the body portion of the frog is provided with a slit or opening 17 of a width to permit insertion of the looped portion 13 of the fastener 12 therethrough. This opening may be made by the pork lure manufacturer or by the fisherman and is spaced from the front end of the body of the pork lure so that a part of this lure will project over the rear end of the spoon. For a pork frog or pork chunk the opening 17 is near the center of the body of the frog or chunk. For a pork strip the opening is spaced back from the front end of the strip.

The looped portion 13 of the fastener is pushed down through the opening 17 of the pork lure so that its loop projects beyond the bottom surface of the lure and preferably in the case of a pork frog or pork chunk so that the flesh side of the pork lure is on top. The projecting end of the loop is then passed over the barb and bight of the hook and moved along the shank to bring the body 18 or front end of the pork lure over the top portion of the spoon at its back end and over the shank of the hook, and then the legs 15 are flexed inwardly and pushed downwardly through the openings 11 and then released so that the angled ends 16 spring out and catch the undersurface of the spoon adjacent the openings 11. To release the pork lure from the spoon, the legs 15 are moved toward each other to release the ends 16 from the spoon and are then swung or moved upwardly through the openings 11, and the looped portion 13 is then released from the hook. The pork lure may then be released from the fastener 12 and returned to its bottle containing preservative.

Instead of a metal fastener, as shown in the embodiment of Fig. 5, the pork lure may be secured to the apertured spoon 8, shown in Fig. 6, by taking a piece of fish line 19 or other flexible cord and forming it to provide a loop such as the loop 13a and by means of a small forked stick pressing this looped end down through the opening 17 of the pork lure so that the loop projects beyond the undersurface of the lure, and then passing this loop over the hook 10 and bringing the pork lure as previously described to a position in which its front end overlaps the rear end of the spoon as shown in Fig. 7. From the loop, the ends of the line are brought forward as indicated at 14A in Fig. 7 in the same way that parts 14 of the fastener extend from its loop 13. Then one end of this line or cord 19 is threaded through one of the openings 11 and the other end threaded through the other opening 11, and the ends brought together and and tied as indicated at 20 in Fig. 6, and then one of these tied ends may be brought around the looped end of the cord and tied to the other end as indicated at 21 to secure the pork lure in position on the spoon.

Since the pork lure is not impaled on the hook in attaching it to the spoon but is held to the hook by the fastener 12 or cord 19, it may be taken off or replaced on the spoon many times without danger of its coming off the hook.

I desire it to be understood that this invention is not to be limited to any particular form or arrangement of parts except in so far as such limitations are included in the claims.

What I claim as my invention is:

1. An artificial bait comprising a spoon having a line attaching means at one end, a hook fixed to the other end of the spoon and projecting rearwardly therefrom, said spoon having spaced openings extending therethrough adjacent the rear end thereof and fastening means for attaching a pork lure having a looped portion adapted to extend through an opening in said pork lure and over the shank of the hook and having ends adapted to extend forwardly from said looped portion over the front end of said pork lure and through said openings in the spoon and secured to the spoon to bind the pork lure against the surface of the spoon adjacent the hook.

2. An artificial bait comprising a spoon having a line attaching means at one end, a hook fixed to the other end of the spoon and projecting rearwardly therefrom, and means adapted to secure the front end of a pork lure over and against a part of the rear end surface of the spoon including a fastener having spaced lure engaging portions detachably secured to the rear end of the spoon and having a looped portion adapted to extend through an opening in the lure and adapted to engage the shank of the hook adjacent the rear end of the spoon.

3. An artificial bait comprising a spoon having a line attaching means at one end, a hook secured to the other end of the spoon and projecting rearwardly therefrom, said spoon having spaced openings adjacent its rear end, and a pork lure fastener of resilient wire having a looped portion adapted to extend through an opening in the lure and adapted to engage over the shank of the hook and end portions adapted to extend forwardly from said looped portion over the rear end of the spoon and a portion of the lure and having legs adapted to extend through said openings in the spoon to bind the lure directly to the top surface of the rear end of the spoon, and means for preventing disengagement of said legs from said openings.

4. An artificial bait comprising a spoon having a line attaching means at one end, a hook secured to the other end of the spoon and projecting rearwardly therefrom, said spoon having spaced openings adjacent its rear end, and a pork lure fastener of resilient wire having a looped portion adapted to extend through an opening in the lure to engage over the shank of the hook and having end portions diverging from said looped portion, and adapted to extend forwardly over the rear end of the spoon and a portion of the lure and having legs adapted to extend through said openings in the spoon to bind the lure directly to the top surface of the spoon and provided with angled feet engageable with said spoon adjacent said openings.

References Cited in the file of this patent

UNITED STATES PATENTS

| | | |
|---|---|---|
| 1,264,627 | Foss | Apr. 30, 1918 |
| 1,925,197 | Maynard | Sept. 5, 1933 |
| 1,928,367 | Buddle | Sept. 26, 1933 |
| 2,167,163 | Toepper | July 25, 1939 |
| 2,509,179 | Warnock | May 23, 1950 |
| 2,590,633 | Lucas | Mar. 25, 1952 |
| 2,617,227 | Keece et al. | Nov. 11, 1952 |
| 2,646,642 | Dunham | July 28, 1953 |